United States Patent [19]

Spence

[11] Patent Number: 5,621,211
[45] Date of Patent: Apr. 15, 1997

[54] SCANNING TUNNELING ATOM-PROBE MICROSCOPE

[76] Inventor: John C. H. Spence, 2010 S. La Rosa Dr., Tempe, Ariz. 85282

[21] Appl. No.: 578,376

[22] Filed: Dec. 26, 1995

Related U.S. Application Data

[63] Continuation of Ser. No. 299,513, Sep. 1, 1994, abandoned.
[51] Int. Cl.⁶ .............................. H01J 37/30; H01J 49/00; B01D 59/44
[52] U.S. Cl. .......................... 250/306; 250/307; 250/287
[58] Field of Search .................................. 250/306, 307, 250/423 F, 492.3, 287

[56] References Cited

U.S. PATENT DOCUMENTS

| | | | |
|---|---|---|---|
| 3,602,710 | 8/1971 | Mueller | 250/306 |
| 3,868,507 | 2/1975 | Panitz | 250/306 |
| 4,942,299 | 7/1990 | Kazmerski | 250/306 |
| 5,061,850 | 10/1991 | Kelly et al. | 250/306 |
| 5,144,148 | 9/1992 | Eigler | 250/492.3 |
| 5,274,234 | 12/1993 | Garcia et al. | 250/423 F |
| 5,440,124 | 8/1995 | Kelly et al. | 250/309 |
| 5,444,260 | 8/1995 | Kazmerski | 250/492.3 |
| 5,471,064 | 11/1995 | Koyanagi et al. | 250/452.2 |

OTHER PUBLICATIONS

Muller, Erwin W. et al., The Atom–Probe Field Ion Microscope, The Review of Scientific Instruments, vol. 39, No. 1 (Jan., 1968).

Binnig, Gerd et al., Scanning tunneling microscopy–from birth to adolescence, Review of Modern Physics, vol. 59, No. 3, Part 1 (Jul., 1987).

*Primary Examiner*—Bruce C. Anderson
*Attorney, Agent, or Firm*—William E. Hein

[57] ABSTRACT

A scanning tunneling atom-probe microscope and method for identifying atoms at an identified site on a sample surface involves first identifying the atoms of interest on the sample surface in images formed by a conventional scanning tunneling microscope. These atoms are then transferred to the tip of the scanning tunneling microscope. The sample is then removed, and the atoms ejected from the tip into a conventional time-of-flight spectrometer. By measuring the time of flight of the atoms from the tip to a channel-plate ion detector, the atomic number of the atoms may be determined.

2 Claims, 1 Drawing Sheet

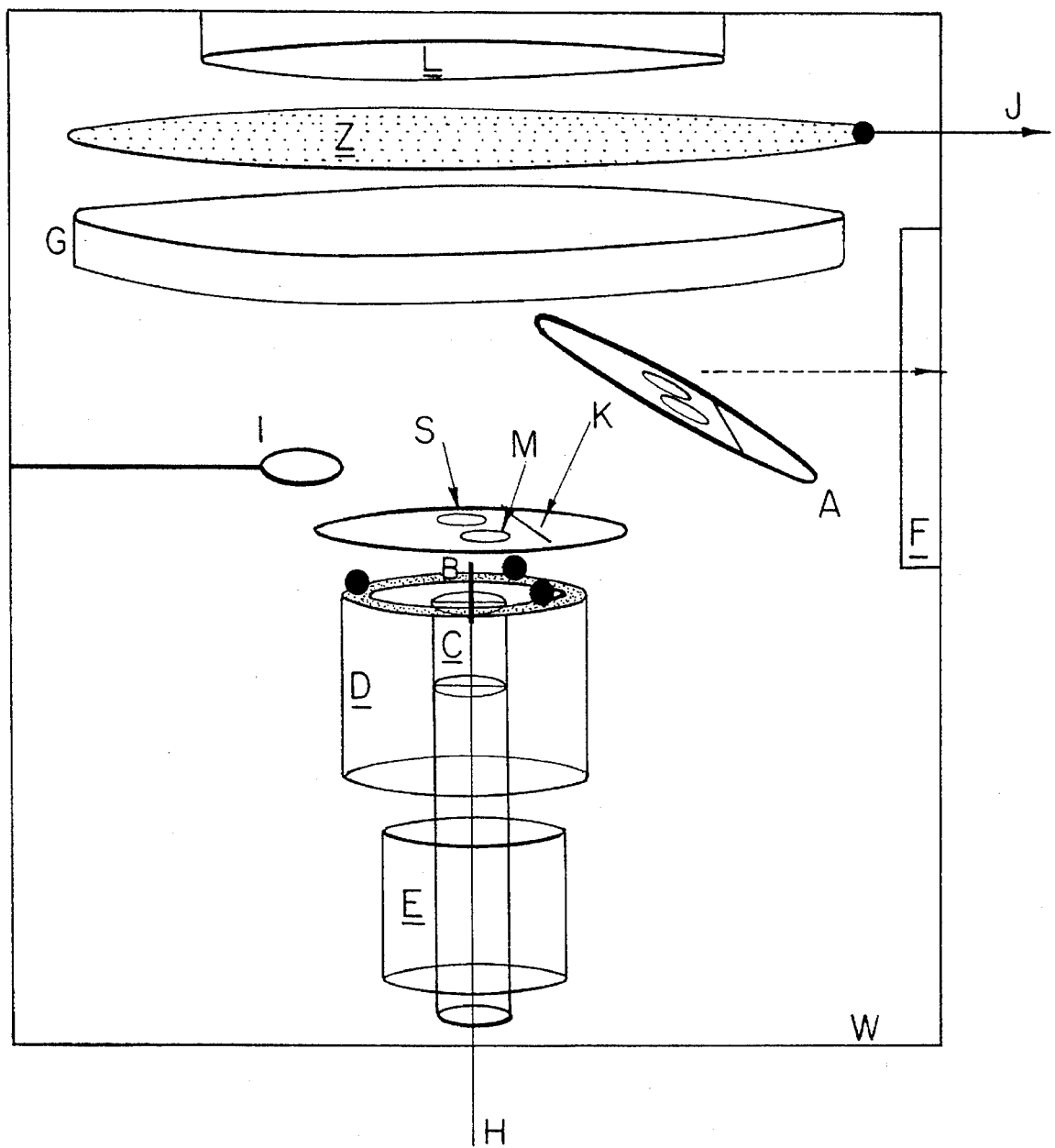

SCANNING TUNNELING ATOM-PROBE MICROSCOPE

CROSS REFERENCE TO RELATED APPLICATION

This application is a continuation of application Ser. No. 08/299,513, filed Sep. 1, 1994, now abandoned.

BACKGROUND AND SUMMARY OF THE INVENTION

This invention relates generally to scanning tunneling miscroscopy and, more particularly, to an apparatus and method for integrating a scanning tunneling microscope and a time-of-flight spectrometer.

Three forms of microscopy in current use are capable of forming interpretable atomic resolution images. These are known as field-ion microscopy, transmission electron microscopy, and scanning probe microscopy. Two of these prior art methods allow the type (i.e. the atomic number) of the atoms in the image to be determined. In electron microscopy, the transmitted energy loss spectrum may be used to identify clusters of atoms by type in favorable cases. However, it is not possible to determine whether these lie within the sample or on its surface, and the method is restricted to a few types of atoms. Using field-ion microscopy and time-of-flight microscopy (the atom probe), it is possible to identify individual atoms at identifiable sites on a surface. However, the sample must be prepared in the form of an atomically sharp needle, and the range of materials which can be studied is limited.

The ability to identify "foreign" atoms on the surface of materials has been sought in many areas of science, from catalysis and solid state chemistry to the semiconductor industry. In surface science, this capability is desired in order to contribute to the basic understanding of mechanisms in crystal growth and the role of impurities in controlling interface properties.

It is therefore the principal object of the present invention to provide an apparatus and process for identifying atoms at particular predetermined sites on a material surface.

This and other objects are accomplished in accordance with the illustrated preferred embodiment of the present invention by first identifying the atoms of interest on a sample surface in images formed by a scanning tunneling microscope. Scanning tunneling microscopes are well known in the prior art, exemplary of which is G. Binning and H. Rohrer, "Scanning Tunneling Mircroscopy-from Birth to Adolescence," Reviews of Modern Physics, Vol. 59, No. 3, Part I, July 1987 (pp. 615–625). These atoms are then transferred to the tip of the scanning tunneling microscope. The sample is then removed, and the atoms ejected from the tip into a conventional time-of-flight spectrometer. By measuring the time of flight of the atoms from the tip to a channel-plate detector, the atomic number of the atoms may be determined.

Unlike the prior art atom probe described by E. Muller et al., "The Atom-Probe Field Ion Microscope," The Review of Scientific Instruments, Vol. 39, No. 1, January 1968 (pp. 83–86), the apparatus and method of the present invention allows large flat samples to be used, and the range of materials which can be studied is almost unlimited. Unlike microanalysis in scanning transmission electron microscopy, the atoms are known to lie on one surface, and there is no limitation on the types of atoms which can be identified.

BRIEF DESCRIPTION OF THE DRAWING

FIG. 1 is a pictorial diagram of a scanning atom-probe microscope constructed in accordance with the present invention.

DETAILED DESCRIPTION OF THE INVENTION

Referring now to FIG. 1, the scanning tunneling atom-probe microscope of the present invention is positioned within an ultra-high vacuum chamber W. A sample S to be studied is mounted on a sample support plate A, which is introduced to the vacuum chamber W through a transfer device F. A two-stage channel-plate ion detector G is capable of detecting small numbers of ions. A lead J is connected to a fluorescent screen Z. Components B, C, D, E, and H form a modified type of scanning tunneling microscope. An atomically sharp tungsten tip B is formed using a retractable heating device I, prior to introduction of the sample S. Field-evaporation and sputtering procedures may also be adopted, using a high-voltage connection H. A piezoelectric device E provides coarse-motion approach for the tip B with sub-nanometer precision. A piezoelectric tube D, which may be bent under electronic control, provides horizontal motion of the sample S by the stick-slip mechanism, well known to those of ordinary skill in the art. Piezoelectric tube D also provides fine lateral motion during scanning. Scanning tunneling microscope images are obtained by scanning the outer piezoelectric tube D by bending, while displaying the voltage needed by the vertical axis piezoelectric tube C for constant tunneling current. Once an atom or a group of atoms of interest has been identified in this image, a small voltage pulse is applied to transfer these atoms onto the tip B. The sample support plate or sample holder A is then either withdrawn or moved laterally to one side so that a small aperture M in sample support plate A becomes aligned with the tip B. A larger pulse, of several nanoseconds duration, is then applied to the tip B, and electronic timer circuitry is initiated. The detection of the field evaporated ions from the tip B at the detector G creates an amplified voltage pulse on the fluorescent screen Z, which sends a pulse on the lead J to stop the electronic timer circuitry. From the transit time of the ions and the length of the flight path, the charge-to-mass ration of the ions may be determined using computations well understood by those persons having ordinary skill in the art. Using this information, the mass of the atoms picked off the surface may be deduced. The sample holder A is positioned on three balls, two of which lie in a vee-shaped groove K. To return the sample holder A to the same region for study after chemical identification is made, a one-dimensional search is made along the direction of the groove K.

During heat treatment of the tip B, the tip surface may be examined by field-ion microscopy using the channel-plate and screen G through a window L. A smaller, distant ion detector may also be used to improve charge-to-mass ratio resolution.

I claim:

1. A scanning tunneling atom-probe microscope positioned within a vacuum chamber for chemically identifying atoms whose atomic numbers are unknown at predetermined sites on a surface of a sample material, comprising:

a scanning tunneling microscope positioned within the vacuum chamber for producing an STM image of said surface, for enabling selection of one or more atoms of interest seen in said image, said scanning tunneling microscope having a tip onto which the selected one or more atoms are transferred from the surface of the sample material;

means for controllably positioning the sample material proximate the scanning tunneling microscope;

a time-of-flight spectrometer positioned within the vacuum chamber for measuring a time-of-flight of said one or more selected atoms of interest ejected from the tip of said scanning tunneling microscope to an ion detector to enable computation of the atomic number of said one or more selected atoms of interest; and heating means removably positioned within the vacuum chamber for controllably heating the tip of said scanning tunneling microscope to thereby eject therefrom the one or more selected atoms of interest.

2. A method for chemically identifying atoms whose atomic number is unknown at predetermined sites on a surface of a sample material, the method comprising the steps of:

introducing a sample material to be studied within a vacuum chamber;

positioning said sample material proximate a scanning tunneling microscope within the vacuum chamber;

selecting one or more atoms of interest, whose atomic numbers are unknown, on the surface of the sample material through images obtained by said scanning tunneling microscope;

applying a first voltage pulse to transfer the one or more selected atoms of interest onto a tip of the scanning tunneling microscope;

removing the sample material from the tip of the scanning tunneling microscope to provide a clear path between the tip and an ion detector positioned within the vacuum chamber;

applying a second voltage pulse to the tip of the scanning tunneling microscope to eject the atoms therefrom;

measuring a time of flight of field-evaporated ions produced by application of said second voltage pulse between the tip of the scanning tunneling microscope to the ion detector positioned within the vacuum chamber; and computing the atomic number of the one or more identified atoms from the measured time of flight.

* * * * *